Jan. 3, 1933. M. E. GASS 1,892,763
GRAIN DRILL STERILIZER MIXING ATTACHMENT
Filed Feb. 8, 1930
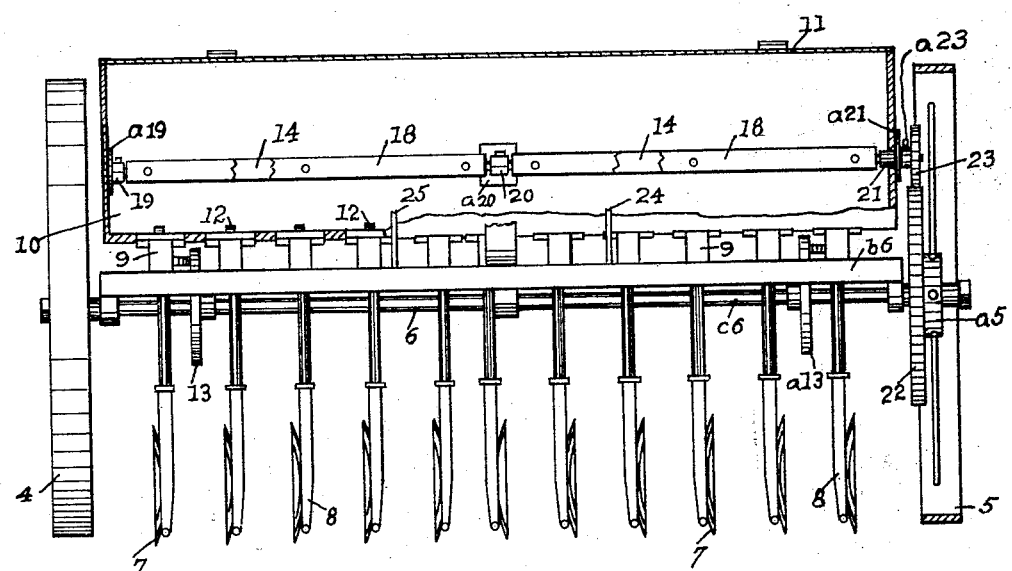
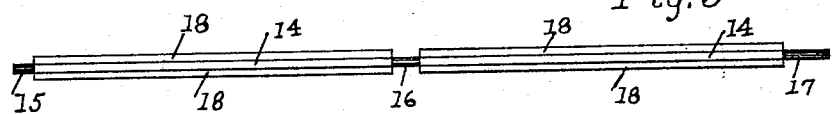
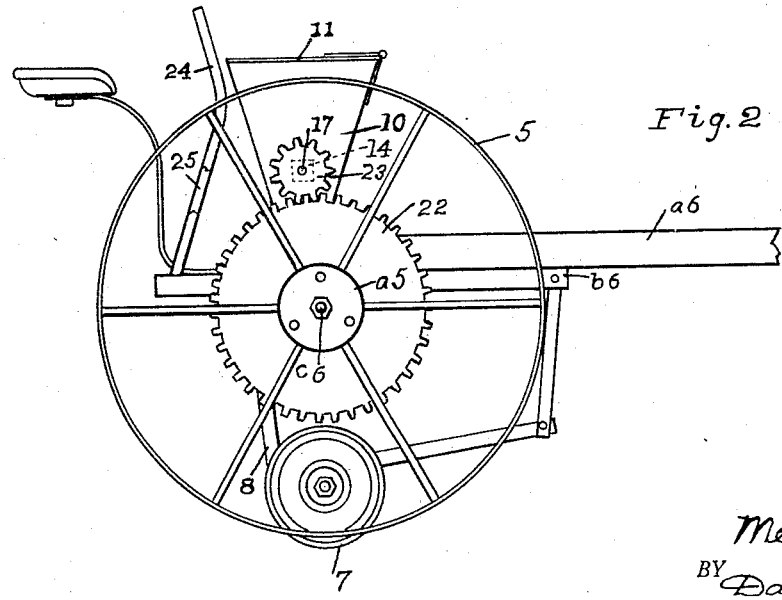
INVENTOR,
Melvin E. Gass.
BY David E. Lain,
ATTORNEY.

Patented Jan. 3, 1933

1,892,763

UNITED STATES PATENT OFFICE

MELVIN E. GASS, OF COLFAX, WASHINGTON

GRAIN DRILL STERILIZER-MIXING ATTACHMENT

Application filed February 8, 1930. Serial No. 426,910.

My invention relates to improvements in grain-drill sterilizer-mixing attachments by which sterilizing powder is mixed with the grain, and has for an object to provide means to mix sterilizing powder with the grain in the drill hopper.

Another object of my improvement is to provide for continuous mixing of powder and grain during drill operation.

Another object of my improvement is to provide for preparing and using the sterilized grain in the drill without exposing the operative thereto.

Another object of my improvement is to provide for sterilizing only a relatively small quantity of grain at a time to avoid having a large unused quantity at the close of drilling operations.

Another object of my improvement is to provide a simple and relatively inexpensive attachment to a grain drill for mixing grain and sterilizer therein which may be a permanent part thereof and thus avoid loss of time in connection with using a separate mixing apparatus.

Hitherto, when treating seed grain with sterilizing powder, usually carbonate of copper, the quantity assumed to be required is prepared in suitable mixing machinery, usually at a central location by the county agricultural agent and placed in grain sacks. From this place it is taken to the field and distributed to several locations therein which has required handling the sacks at least twice. As needed it is dumped in the drill hopper from the sacks. Each handling of the sacked sterilized grain and placing it in the hopper exposes the nose and throat of the operative to the fine, light poisonous sterilizing powder, always to his inconvenience and sometimes to his positive injury. Furthermore, to avoid loss of time, it is usual for a larger quantity of grain to be ordered than the planting subsequently requires and the remainder may be a total loss. My improvement makes this exposure of the operative and loss of grain quite unnecessary.

I attain these and other objects of my improvement with the mechanism illustrated in the accompanying sheet of drawings forming a part of this specification in which Figure 1 is a rear end elevation of a grain drill with my improvement in place thereon, Fig. 2 is a side elevation of Fig. 1 and Fig. 3 is a plan view of the mixing bar shown by itself.

The illustrations of the grain drill herewith are to a degree conventional with many details not shown; but this apparatus is well known by those skilled in the art and enough is shown to clearly indicate the relation of my improvement to the usual structure.

Similar characters refer to similar parts throughout.

Certain parts are broken away for lack of space or to show other parts hidden thereby.

My mixing attachment consists of a flat bar of iron 14 two and one-half inches wide one end of which 15 is shaped to provide a gudgeon. The central part 16 is cylindrical to serve as a journal and the other end 17 is also cylindrical to serve as a journal with an extension thereof to mount a gear or sprocket wheel, 23.

On the interior of one of the end walls of hopper 10 is fastened removable-cap bearing 19 by flange $a$19 thereof. On the interior of the front wall of said hopper is fastened flange $a$20 of the bearing bracket integral with removable-cap bearing 20 in line with said bearing 19 and in an opening in the other end wall of hopper 10 is fastened bearing 21 by flange $a$21 thereon in line with bearings 19 and 20. Said bearings 19, 20 and 21 are disposed to mount mixing bar 14 longitudinally within hopper 10 preferably below the middle thereof with gudgeon 15 in bearing 19, central journal 16 in bearing 20 and journal 17 in bearing 21.

Driving spur gear 22 is fastened on the inner side of wheel 5 concentric therewith and with it is engaged spur gear 23 mounted on the outer end of shaft 17 to which it is fastened by set screw $a$23. The construction provides for the revolution of mixing bar 14, by drill wheel 5. If the rate of revolution of said mixing bar is not suitable, it is changeable by changing the diameters of gears 22 and 23. During the entire time of drilling operations mixing bar 14 is revolved by wheel 5 and causes a thorough mixing movement of the grain in hopper 10 throughout the entire length thereof until said grain is drawn down in the hopper by the planting operations below contact with said mixing bar. The bar is purposely placed in the hopper at the location below which the grain therein usually is not drawn off but, having reached this level, the hopper is again filled.

In operation: When beginning the use of the drill and hopper 10 is empty, a quantity of grain may be placed therein to the level of the bottom of mixing bar 14, and the proper amount of sterilizing powder scattered thereover and the whole stirred by hand till mixed. Then the hopper is filled with grain and the proper quantity of said powder is spread thereover, after which cover 11 is closed and the drilling of the grain proceeds. At first the mixture of grain and powder in the bottom of the hopper is drawn off while the grain above the mixing bar is being thoroughly mixed with the powder scattered thereover, as described, and as said mixture at first below the bar is drawn off it is replaced by a mixture made by the revolving bar. Subsequently the mixture is not drawn off below the mixing bar before the hopper is again filled with grain and a proper quantity of the powder is scattered thereover, as above described, and the mixing of the added materials proceeds as the drill wheel 5 is revolved by the drawn vehicle.

In practice it has been found that the slight exposure to the poisonous powder dust during the initial hand mixing and the subsequent scattering of the powder on top of the hopper full of grain is not serious where ordinary care is observed. While, in the described manner, most complete mixing of the grain and powder proceeds by power from the drill wheel during entire drilling operations.

What I claim is:

A sterilizer mixing attachment for grain drills of the type having an elongated seed hopper mounted on ground wheels, comprising bearings mounted one at each end of the hopper and one centrally of the hopper, a relatively flat mixing bar provided with cylindrical end portions and a central cylindrical portion engaging in said bearings, a gear attached to one of the ground wheels and meshing with a second gear mounted on one end of said mixing bar whereby the mixing bar may be rotated within the hopper to mix the seed and the sterilizer.

MELVIN E. GASS.